United States Patent
Morgan et al.

(10) Patent No.: US 8,055,716 B2
(45) Date of Patent: Nov. 8, 2011

(54) DYNAMIC CREATION OF MAIL ALIASES USABLE IN ELECTRONIC COMMUNICATIONS

(75) Inventors: Janet Morgan, Beaverton, OR (US); Johnny M. Shieh, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 285 days.

(21) Appl. No.: 11/550,973

(22) Filed: Oct. 19, 2006

(65) Prior Publication Data

US 2008/0098069 A1   Apr. 24, 2008

(51) Int. Cl.
*G06F 15/16* (2006.01)
(52) U.S. Cl. ......... 709/206; 709/200; 709/220; 713/159
(58) Field of Classification Search .......... 709/200, 709/206, 220; 713/155, 159
See application file for complete search history.

(56) References Cited

U.S. PATENT DOCUMENTS

| | | | | |
|---|---|---|---|---|
| 5,897,635 | A * | 4/1999 | Torres et al. | 707/10 |
| 6,016,520 | A * | 1/2000 | Facq et al. | 710/33 |
| 6,154,764 | A * | 11/2000 | Nitta et al. | 709/200 |
| 6,256,663 | B1 * | 7/2001 | Davis | 709/204 |
| 6,484,033 | B2 * | 11/2002 | Murray | 455/456.3 |
| 6,591,291 | B1 * | 7/2003 | Gabber et al. | 709/206 |
| 6,668,278 | B1 * | 12/2003 | Yen et al. | 709/218 |
| 6,775,689 | B1 * | 8/2004 | Raghunandan | 709/206 |
| 6,964,012 | B1 * | 11/2005 | Zirngibl et al. | 715/201 |
| 7,054,906 | B2 * | 5/2006 | Levosky | 709/206 |
| 7,080,076 | B1 * | 7/2006 | Williamson et al. | 707/9 |
| 7,216,227 | B2 * | 5/2007 | Grynberg | 713/162 |
| 7,356,332 | B2 * | 4/2008 | Pell et al. | 455/414.1 |
| 7,493,390 | B2 * | 2/2009 | Bobde et al. | 709/224 |
| 7,783,741 | B2 * | 8/2010 | Hardt | 709/224 |
| 7,822,819 | B1 * | 10/2010 | Levosky | 709/206 |
| 2002/0075305 | A1 * | 6/2002 | Beaton et al. | 345/751 |
| 2002/0138588 | A1 * | 9/2002 | Leeds | 709/217 |
| 2002/0152272 | A1 * | 10/2002 | Yairi | 709/206 |
| 2003/0158888 | A1 * | 8/2003 | Bjorklund et al. | 709/201 |
| 2004/0193685 | A1 * | 9/2004 | Proehl | 709/204 |
| 2005/0154665 | A1 * | 7/2005 | Kerr | 705/35 |
| 2005/0204011 | A1 * | 9/2005 | Velayudham | 709/206 |
| 2005/0228899 | A1 * | 10/2005 | Wendkos et al. | 709/232 |
| 2006/0026438 | A1 * | 2/2006 | Stern et al. | 713/184 |
| 2008/0195953 | A1 * | 8/2008 | Sen | 715/744 |
| 2010/0333092 | A1 * | 12/2010 | Stefansson et al. | 718/100 |

FOREIGN PATENT DOCUMENTS

CA   2447121  A1 *  1/2004

* cited by examiner

*Primary Examiner* — Krista Zele
*Assistant Examiner* — Anthony Fabbri
(74) *Attorney, Agent, or Firm* — Steven L. Bennett, Esq.; Kevin P. Radigan, Esq.; Heslin Rothenberg Farley & Mesiti P.C.

(57) ABSTRACT

Mail aliases are dynamically created in response to replies of an electronic mail (e-mail) communication. An e-mail communication is sent to a plurality of recipients, and one or more recipients of the e-mail communication respond to the e-mail. In response to receiving the replies, one or more mail aliases are automatically created.

18 Claims, 6 Drawing Sheets

DYNAMIC CREATION OF MAIL ALIASES USABLE IN ELECTRONIC COMMUNICATIONS

TECHNICAL FIELD

This invention relates, in general, to electronic communications, and in particular, to the efficient creation of mail aliases employed in sending electronic mail.

BACKGROUND OF THE INVENTION

To facilitate communicating electronically, mail aliases are employed. A mail alias enables a plurality of recipients of an electronic mail (e-mail) communication to be specified by one name (an alias) assigned to that plurality of recipients. Mail aliases are particularly useful when electronic mail is to be sent to a group of recipients more than one time.

In order to use a mail alias, the mail alias is created and a set of members (e.g., recipients) is associated with that alias. Then, when an e-mail is to be sent out to the members of the alias, the mail alias is typed into the TO section of the e-mail header, instead of the individual members of the alias. By invoking the send function, the e-mail is sent to the members associated with that mail alias.

A mail alias is created as a static entity. That is, the mail alias remains defined to a set of members, until that alias is manually updated. To update the alias, the author of the alias (or another entity) adds a new member, deletes a member or makes other changes. This manual process is tedious and prone to error.

SUMMARY OF THE INVENTION

Based on the foregoing, a need exists for a capability to dynamically create mail aliases. For example, a need exists for a capability that enables mail aliases to be created automatically, in response to replies received to an e-mail sent using a mail alias.

The shortcomings of the prior art are overcome and additional advantages are provided through the provision of a method of dynamically creating mail aliases usable in electronic communications. The method includes: receiving a response to an electronic mail sent via a mail alias to a plurality of recipients, the receiving including receiving one or more responses from one or more recipients of the plurality of recipients, the mail alias being different than respective electronic mail addresses of the plurality of recipients; determining, in response to the receiving, that one electronic mail with one message is to be sent to one group of one or more members meeting a first criterion and another electronic mail with another message is to be sent to another group of one or more members meeting a second criterion different than the first criterion, wherein the first criterion includes non-responding to the electronic email sent via the mail alias to the plurality of recipients, and wherein the second criterion comprises responding to the electronic email sent via the mail alias to the plurality of recipients; subsequently, upon a predefined occurrence, automatically creating, by a communications unit of the communications environment, one or more additional mail aliases, in response and with reference to receiving of the one or more responses, the one or more additional mail aliases being distinct from the mail alias, wherein the automatically creating comprises automatically generating for each additional mail alias of the one or more additional mail aliases a new name for the additional mail alias and automatically associating an electronic mail address of each member of a group of members to the automatically generated new name of the additional mail alias to enable the group of members to be specified via the additional mail alias, the additional mail alias being distinct from the respective electronic mail addresses of the group of members, and wherein the additional mail alias is subsequently selected and inserted into a TO section of the electronic mail header of a subsequent electronic mail to be sent to the group of members via an electronic mail program and wherein the group of members is selected, at least in part, responsive to the receiving of the one or more responses from the one or more recipients; and wherein the automatically creating further comprises creating a mail alias for the one group, wherein the mail alias for the one group includes an electronic mail address for each member of the one or more members meeting the first criterion, and wherein the automatically creating further creates a mail alias for the another group that includes an electronic mail address for each member of the one or more members meeting the second criterion, wherein the automatically creating further includes adding an electronic mail address for a responder to the mail alias for the another group, in response to the responder responding.

In a further aspect of the present invention, a method of dynamically creating mail aliases usable in electronic communications is provided, in which the method includes, for instance: creating an electronic mail to be sent to a plurality of recipients via a mail alias, the mail alias being different than respective electronic mail addresses of the plurality of recipients, and the creating including an indication that one or more additional mail aliases are allowed to be automatically created: sending the electronic mail to the plurality of recipients via the mail alias: receiving one or more replies to the electronic mail from one or more recipients of the plurality of recipients: determining, in response to the receiving, that one electronic mail with one message is to be sent to one group of one or more members meeting a first criterion and another electronic mail with another message is to be sent to another group of one or more members meeting a second criterion different than the first criterion, wherein the first criterion comprises non-responding to the electronic email sent via the mail alias to the plurality of recipients, and wherein the second criterion comprises responding to the electronic email sent via the mail alias to the plurality of recipients; determining whether a predetermined event has occurred; upon occurrence of the predetermined event, automatically creating, by a communications unit of the communications environment, an additional mail alias of non-responders in response to the occurrence of the predetermined event, the additional mail alias of non-responders being distinct from the mail alias and including recipients of the plurality of recipients that have not responded to the electronic mail and excluding recipients of the plurality of recipients that have responded to the electronic mail wherein the automatically creating the additional mail alias of non-responders includes automatically generating a new name for the additional mail alias of non-responders and automatically associating an electronic mail address of each non-responder to the electronic mail to the automatically generated new name of the additional mail alias of non-responders to enable the non-responders to be specified via the additional mail alias of non-responders, the additional mail alias of non-responders being distinct from the respective electronic mail addresses of the non-responders; upon occurrence of the predetermined event, automatically creating, by the communications unit of the communications environment, an additional mail alias of responders, in response to the occurrence of the predetermined event, the additional mail alias of responders being distinct from the mail alias and including the recipients of the plurality of recipients that have responded over time to the electronic mail and excluding recipients of the plurality of recipients that have not responded to the electronic mail, wherein the automatically creating the additional mail alias of responders includes automatically generating a new name for the additional mail alias and automatically associating an electronic mail address of each responder to the electronic mail to the automatically generated new name of the additional mail alias of responders to enable the responders to be specified via the additional mail alias of responders, the additional mail alias of responders being distinct from the respective electronic mail addresses of the responders, and wherein the automatically creating further includes adding an electronic mail address for at least one responder to the additional mail alias of responders, in response to the responder responding; and selecting at least one of the additional mail alias of non-responders or the additional mail alias of responders to send an electronic mail to members of the at least one of the additional mail alias of non-responders or the additional mail alias of responders, wherein the selecting includes providing the selected additional mail alias in a TO header of the electronic mail to be sent to members of the at least one of the additional mail alias of non-responders or the additional mail alias of responders.

System and computer program products corresponding to one or more of the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided that enables mail aliases to be dynamically created. In one example, in response to receiving replies from an e-mail communication, one or more mail aliases are automatically created. As one example, the e-mail communication is sent via a mail alias, and the one or more automatically created mail aliases are modified versions of the e-mail alias used to send the e-mail communication. As used herein, an e-mail or e-mail communication includes any transmission of information that is capable of receiving a response, including, for instance, any electronic transmission of information; and a recipient is an intended receiver of the e-mail.

Figure 1:
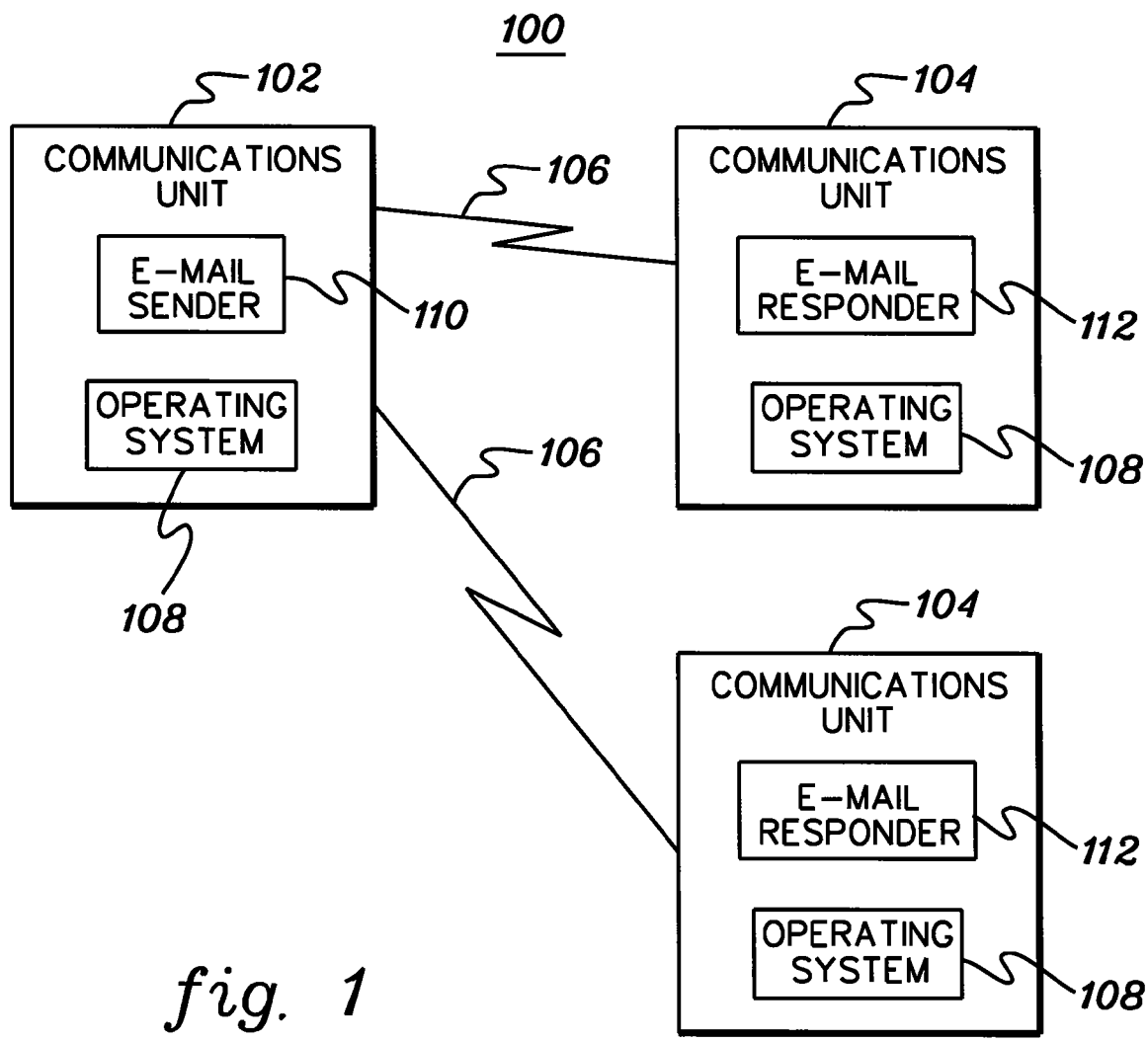
FIG. 1 depicts one embodiment of a communications environment to incorporate and use one or more aspects of the present invention.

One embodiment of a communications environment to incorporate and use one or more aspects of the invention is described with reference to FIG. 1. A communications environment 100 may include, for instance, a communications unit 102 coupled to a plurality of other communications units 104 via one or more connections 106. A communications unit may include, for instance, a personal computer, a laptop, a handheld unit, a workstation, a mainframe, a mini computer or any other type of unit capable of sending and/or receiving e-mails. Communications unit 102 may or may not be the same type of communications unit as communications units 104. Additionally, each of communications units 104 may or may not be the same type of unit as another communications unit 104. The connections coupling the units are, for instance, any type of network connection, such as an internet connection, a local area network (LAN), a wide area network (WAN); a token ring; an Ethernet connection, etc.

Each communications unit 102, 104 executes, for example, an operating system 108, such as, for instance, AIX®, offered by International Business Machines Corporation, Armonk, N.Y.; Linux; Windows®; or other operating systems, etc. (AIX® and IBM® are registered trademarks of International Business Machines Corporation, Armonk, N.Y., U.S.A. Windows® is a registered trademark of Microsoft Corporation, Redmond, Wash. Other names used herein may be registered trademarks, trademarks or product names of International Business Machines Corporation or other companies.) The operating system of one communications unit may be the same or different from another communications unit. Further, in other examples, one or more of the communications units may not include an operating system. Although three (3) communications units are depicted in FIG. 1, more or less units may be included. In one example, communications unit 102 is communicatively coupled to a number of communications units.

Communications unit 102 includes, for instance, an e-mail sender 110, which sends e-mail communications to one or more communications units 104. In this example, each of communications units 104 includes an e-mail responder 112 that receives and responds to the e-mail communications received from e-mail sender 110.

To facilitate the sending of an e-mail from sender 110 to a plurality of e-mail responders 112, a mail alias is created that includes the members destined to receive the e-mail. The mail alias is created manually by the author inputting each member in the alias. In one example, each member is identified by an e-mail address, and optionally, a name. In other embodiments, each member is identified by other criteria, such as a mail alias for one or more members.

As one example, assume an e-mail is to be sent to a plurality of people interested in brown bag lecture sessions. An alias is created, named Brown-Bag, that includes the following members, as examples: Tom, Dick, Harry, Jack, Jill, Jane and Joe. The alias, Brown-Bag, is typed in the e-mail header (e.g., TO section), and the e-mail program knows to send the e-mail to each member of the alias. The content of the e-mail may be: "Hey folks, we have a speaker coming to talk about object oriented data structures this Friday. Please let me know one way or the other if you can attend so I know what size of a room to reserve."

The e-mail is sent to the members of the alias and responses are expected back. Assume, however, that only two members, Dick and Jane, respond within a predefined amount of time. At some point, the e-mail sender wants to send out another e-mail regarding the brown bag session to occur this Friday. For example, the sender wants to send the message again to those that have not responded (e.g., Tom, Harry, Jack, Jill and Joe). As a further example, instead of or in addition to sending the message to those that have not responded, the sender wants to send a further communication to those that have responded.

To facilitate sending the message(s), other mail aliases are created. In accordance with an aspect of the present invention, one or more other mail aliases are automatically created based on the responses received to the e-mail communication. This is described in further detail with reference to FIGS. 2-4.

Figure 2:
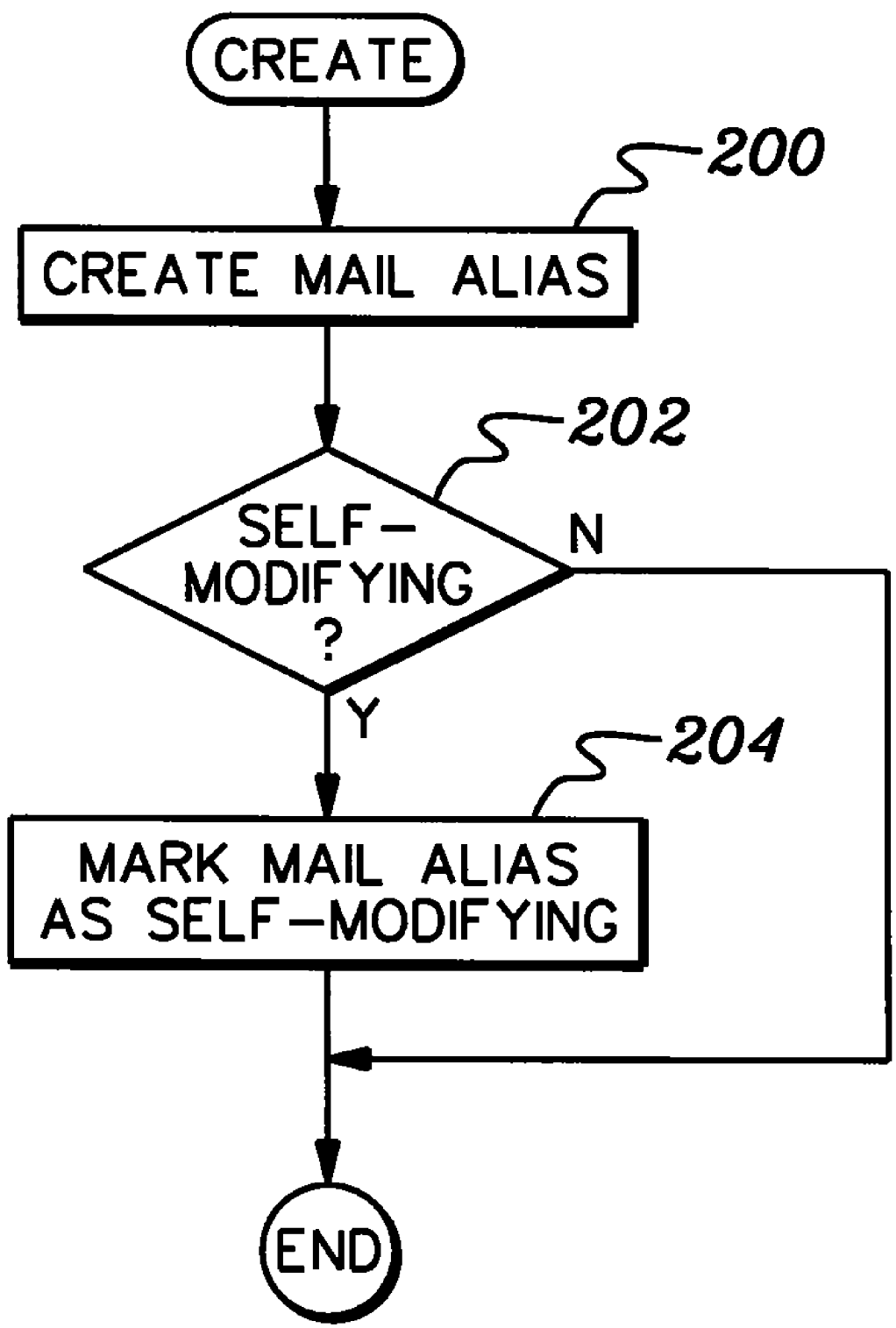
FIG. 2 depicts one embodiment of the logic used in creating a mail alias, in accordance with an aspect of the present invention.

Referring initially to FIG. 2, to enable the dynamic creation of mail aliases, certain setup is performed. In one embodiment, the setup is performed during creation of the initial mail alias, and it is performed by software logic, firmware and/or hardware components of communications unit 102 (FIG. 1) (e.g., as part of the e-mail program executing within the communications unit). This logic is described with reference to FIG. 2.

With reference to FIG. 2, in one embodiment, a mail alias is created, STEP 200. This mail alias has a name (e.g., Brown-Bag), and includes a plurality of members designated by addresses, names, identifiers and/or any other means of identifying the members. The mail alias is created using, for instance, a graphical user interface (GUI).

An inquiry is made as to whether the author of this mail alias desires for this mail alias to be self-modifying, INQUIRY 202. If the author wishes for this mail alias to be self-modifying, thereby allowing one or more other mail aliases to be dynamically created, the author designates this mail alias as self-modifying, STEP 204. In one example, this is accomplished by using a check off box included in the alias creation GUI to indicate that the mail alias is to be self-modifying. Processing of the create mail alias is complete. Should the user not want the mail alias to be self-modifying, then it is not indicated as self-modifying, and processing of the create mail alias is complete.

Some time subsequent to creating the mail alias (e.g., seconds, minutes, hours, days, weeks, months, or any other desired time interval), e-mail sender 110 (FIG. 1) sends out an e-mail communication to those members listed in the mail alias. One embodiment of the logic associated with this processing is described with reference to FIG. 3. Again, this processing is performed by software logic, firmware and/or hardware components of communications unit 102 (FIG. 1).

Figure 3:
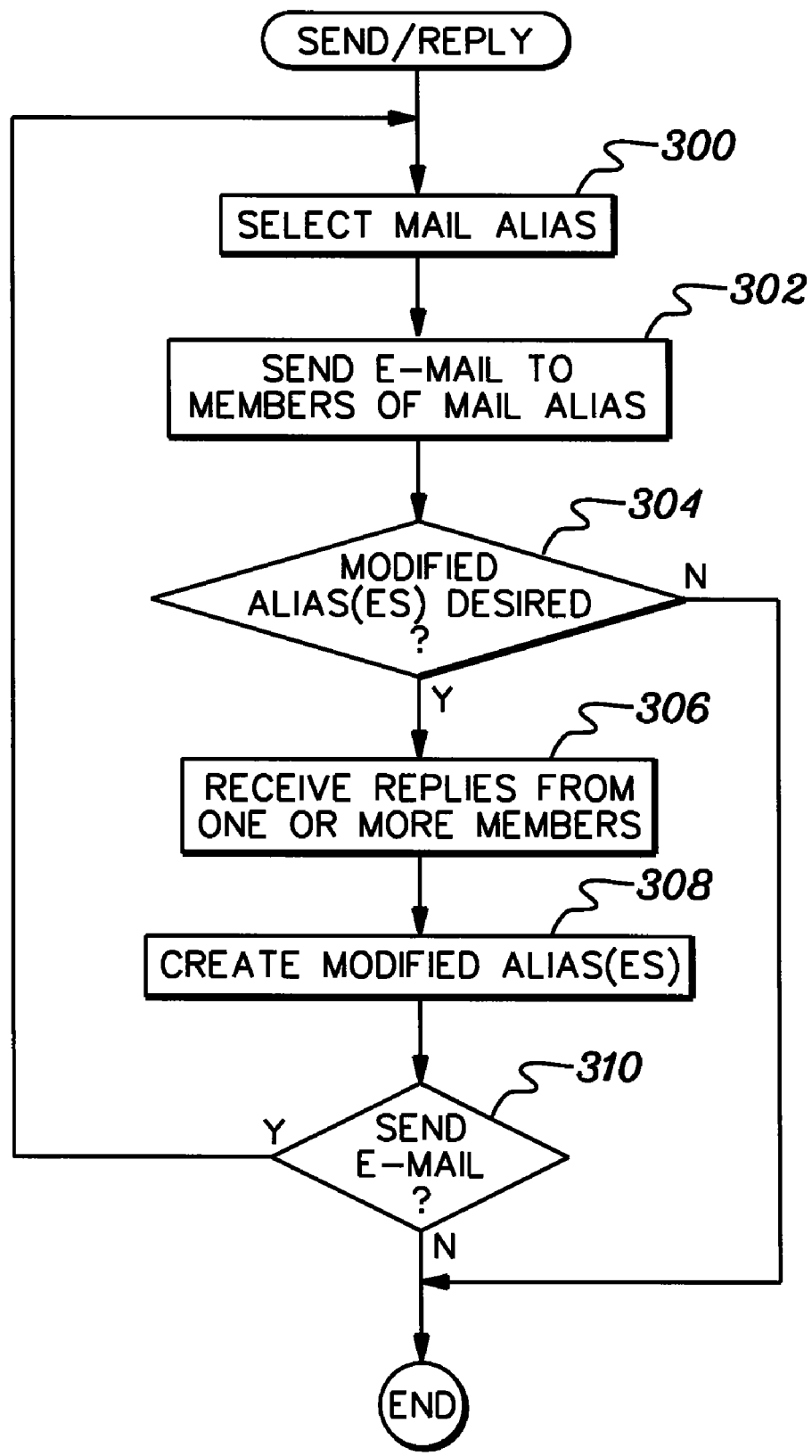
FIG. 3 depicts one embodiment of the logic employed in sending and receiving replies to an e-mail communication, in accordance with an aspect of the present invention.

Referring to FIG. 3, the sender (e.g., sender 102 of FIG. 1) selects the mail alias to be used to send out the e-mail communication, STEP 300 (FIG. 3). In this example, the mail alias created above (e.g., Brown-Bag) is selected to send an e-mail communication to the members of that alias. The e-mail communication is sent to the members of the mail alias, STEP 302.

A determination is made as to whether modified mail aliases are desired, INQUIRY 304. This determination is made, for instance, based on the mark placed on the mail alias GUI when the mail alias was created. In other embodiments, this determination is made, for instance, when an e-mail to multiple individuals is sent or received and based on a prompted inquiry as to whether the modified alias is desired.

If modified aliases are not desired, then processing continues as before (e.g., wait for replies, etc.). However, if modified aliases are desired, then processing continues, as described herein.

In response to sending out the e-mail communication via the mail alias, one or more replies are received from one or more members of the mail alias, STEP 306. These replies are associated with this e-mail communication based on an identification (e.g., message number, etc.) placed in the e-mail by the system or manually and returned in the replies. In response to receiving these replies, one or more other mail aliases are dynamically created, STEP 308. In one example, the one or more other mail aliases are different versions of the mail alias used in sending the e-mail. The other mail aliases are created based on the responses (e.g., whether or not a response was received), but not, in this embodiment, on the content of the response. Further, details regarding creating the other aliases are described below.

Thereafter, at some selected time, another e-mail communication may be sent using one of the other mail aliases dynamically created in STEP 308, INQUIRY 310. If an e-mail communication is not to be sent, then processing is complete. However, if an e-mail communication is to be sent, this e-mail communication can include the same message as sent previously or a different message tailored for the members of a selected modified alias. Processing continues with STEP 300 in which a mail alias is selected. In this particular example, one of the dynamically created mail aliases is selected to be used in sending the e-mail communication.

Further details regarding creating the one or more other aliases are described with reference to FIG. 4. Again, this processing is performed by software logic, firmware, and/or hardware components of communications unit 102. With this processing, the alias author (or other user) determines when another alias based on responses is to be created. That is, the author specifies the occurrence of an event that triggers dynamic creation of at least one other mail alias. Examples of events include an elapse of a predetermined amount of time (e.g., after x number of days, after x number of hours, after x number of minutes, etc.), receipt of a specified number of replies, etc. Many other events are possible. As examples, the author specifies the events at alias creation time or as a default indication in the e-mail application.

Figure 4:
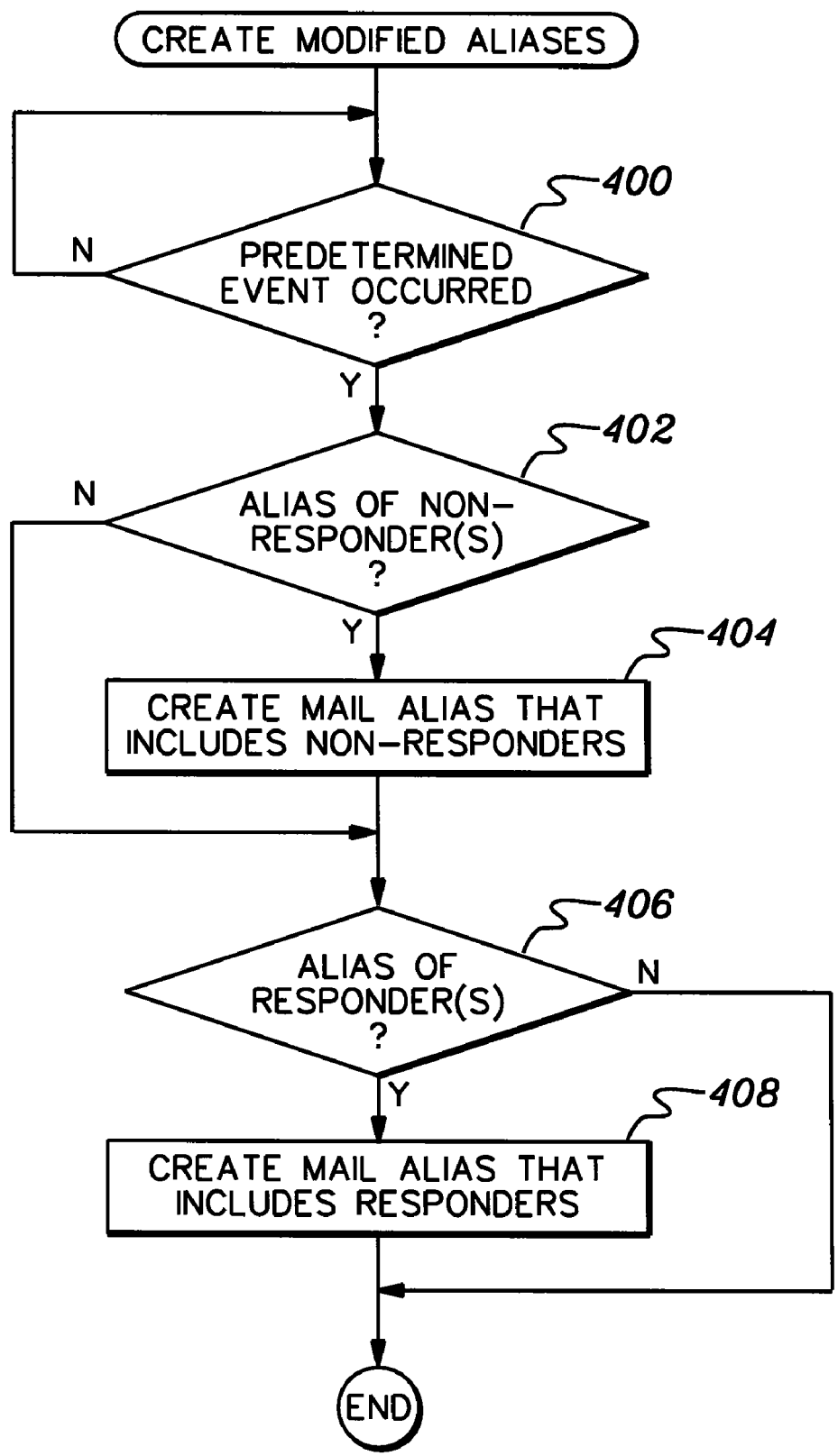
FIG. 4 depicts one embodiment of the logic used to dynamically create modified mail aliases, in accordance with an aspect of the present invention.

Thus, in one embodiment, the logic determines whether the predetermined event has occurred, INQUIRY 400 (FIG. 4). If the event has not occurred, then another alias is not created, and processing remains at INQUIRY 400. However, if the event has occurred, then one or more aliases are dynamically created.

In one particular example, a determination is made as to whether an alias of non-responders is to be created, INQUIRY 402. If an alias of non-responders is to be created, then that mail alias is created, STEP 404. In one example, this mail alias includes only those members of the previous mail alias that have not responded. Those members that have responded are excluded from this alias. To create the mail alias, a name is given to the alias by the system (e.g., logic of the e-mail system). Since, in this example, this alias is a modified version of Brown-Bag or otherwise related to Brown-Bag, a name similar to Brown-Bag is assigned to this alias, e.g., Brown-Bag.1. This name is set apart from the original alias by italics, in one example, to indicate that it is dynamically created, and in one embodiment, temporary. The logic then selects the members from the original alias that have not responded and adds them to this alias. Thus, in this example, Brown-Bag.1 includes Tom, Harry, Jack, Jill and Joe.

Figure 5A:
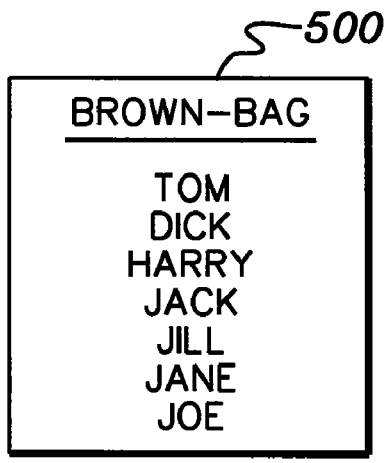
FIG. 5a pictorially depicts one example of a mail alias used in accordance with an aspect of the present invention.
Figure 5B:
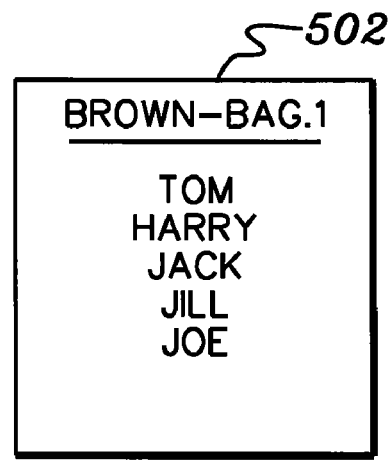
FIGS. 5b-5e pictorially depict examples of dynamically created mail aliases, in accordance with an aspect of the present invention.

Pictorially, FIG. 5a depicts one example of Brown-Bag (500), along with its members, and FIG. 5b depicts one example of dynamically created Brown-Bag.1 502, along with its members. As shown, Brown-Bag.1 includes a subset of the members of Brown-Bag.

To send an e-mail to Brown-Bag.1, the user starts typing the letters B-r-o . . . and the mail program provides two options: Brown-Bag and Brown-Bag.1. Brown-Bag.1 is selected and the e-mail is sent.

Figure 5C:
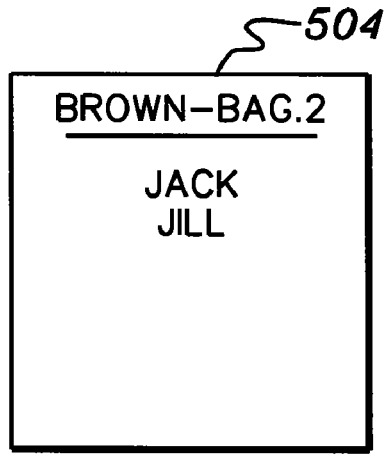

In addition to Brown-Bag.1, other mail aliases can be dynamically created, in response to receiving further replies. For instance, in response to sending an e-mail communication to the members of Brown-Bag.1 (e.g., Tom, Harry, Jack, Jill and Joe), Tom, Harry and Joe respond. Then, in accordance with an aspect of the present invention, another alias (e.g., Brown-Bag.2) is created, as described herein, which includes those members that still have not responded (e.g., Jack and Jill). One example of dynamically created Brown-Bag.2 (504) is depicted in FIG. 5c. This process can be repeated until all members have responded or until desired.

Figure 5D:
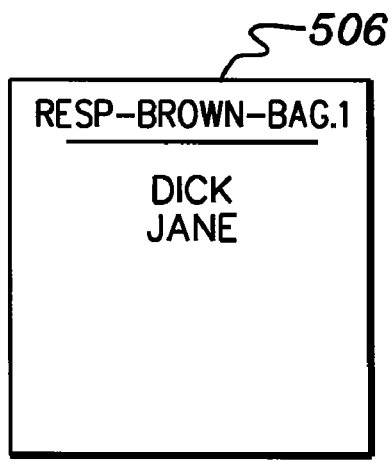
Figure 5E:
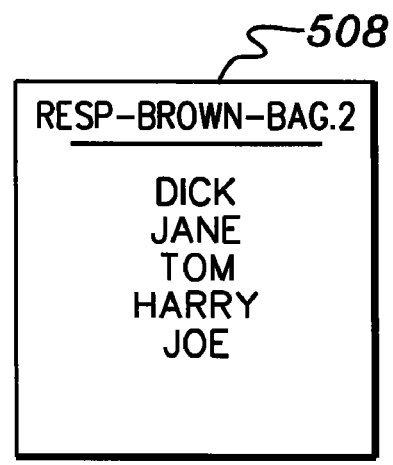

Returning to FIG. 4, moreover, in this particular example, a further determination is made as to whether another alias is to be created, INQUIRY 406. This alias is an alias of responders. If this alias is not to be created, then processing is complete. However, if this alias is to be created, then it is created, as described above for non-responders, STEP 408. In this example, the mail alias includes those members that have responded (e.g., resp-Brown-Bag.1 (506, FIG. 5d) includes Dick and Jane; resp-Brown-Bag.2 (508, FIG. 5e) includes, Dick, Jane, Tom, Harry, Joe; etc.) These aliases are set apart, in one embodiment by italics and underlining, as examples. The dynamic creation of responder aliases allows a user to easily send further communications to those members that have responded.

Although the above logic describes the creation of two types of aliases: non-responder and responder, these are only examples. The logic can create one type of alias (i.e., non-responder, responder or any other type) or more than one type of alias that may or may not include responder and/or non-responder. There are many variations possible.

Described in detail above is a capability for automatically creating and using an adaptive e-mail alias, which tracks responses and self-adjusts its values. The adjustment is based on detected responses in the e-mail system. For instance, an e-mail communication is sent out via a mail alias. Responses to that e-mail communication are automatically tracked and one or more other e-mail aliases, based on the responses, are automatically created. No user intervention is required in the tracking and dynamic alteration of the aliases. This tracking and dynamic alteration is controlled by the applications that generate e-mails. These dynamically created e-mail aliases are, for instance, modified versions of the alias used to send out the e-mail communication.

One or more aspects of the present invention can be included in an article of manufacture (e.g., one or more computer program products) having, for instance, computer usable media. The media has therein, for instance, computer readable program code means of logic (e.g., instructions, code, commands, etc.) to provide and facilitate the capabilities of the present invention. The article of manufacture can be included as a part of a computer system or sold separately.

Figure 6:
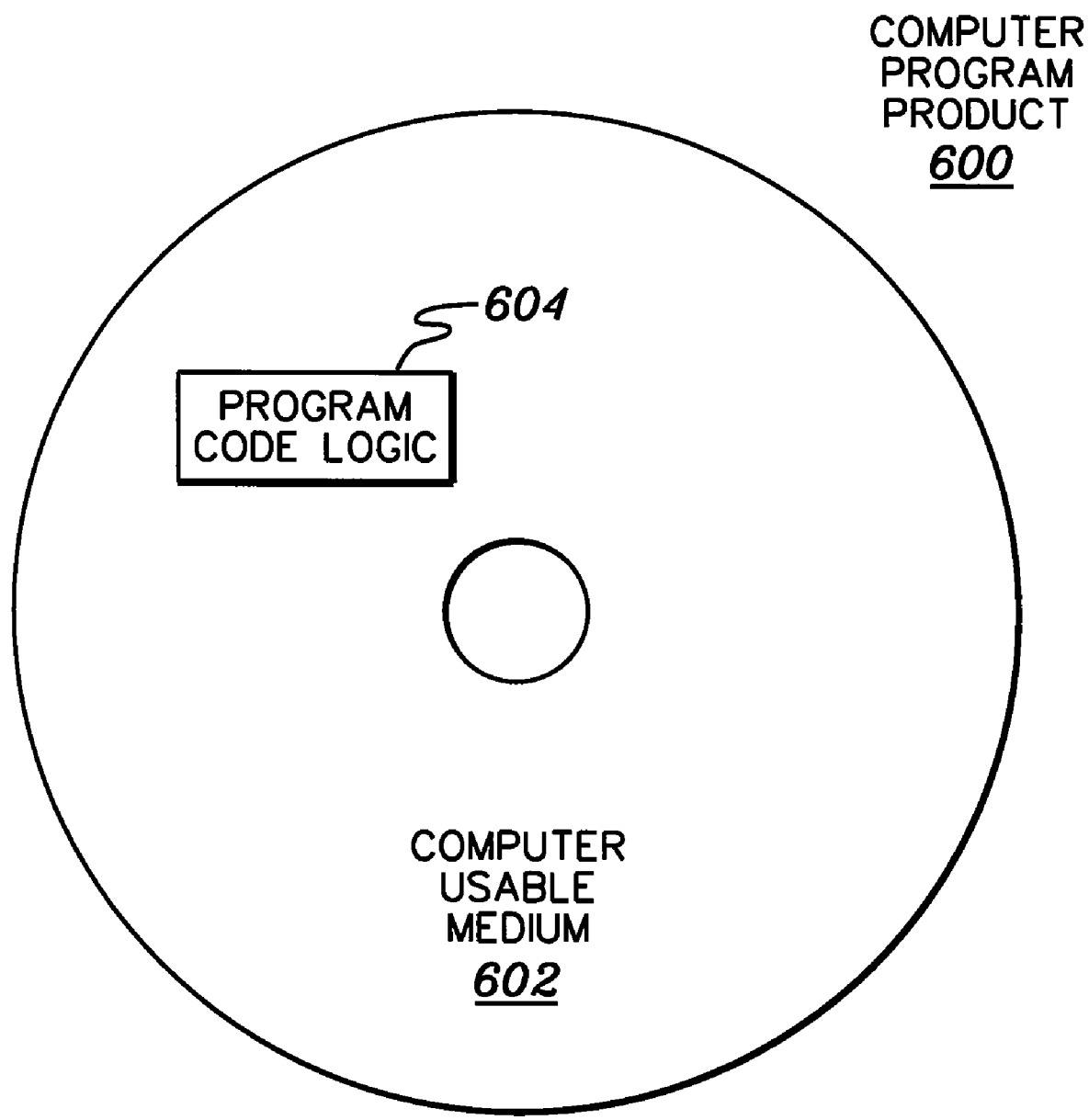
FIG. 6 depicts one embodiment of a computer program product to incorporate one or more aspects of the present invention

One example of an article of manufacture or a computer program product incorporating one or more aspects of the present invention is described with reference to FIG. 6. A computer program product 600 includes, for instance, one or more computer usable media 602 to store computer readable program code means or logic 604 thereon to provide and facilitate one or more aspects of the present invention. The medium can be an electronic, magnetic, optical, electromagnetic, or semiconductor system (or apparatus or device). Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, mail aliases are automatically created based on responses to an e-mail communication. This provides an efficient mechanism to enable additional e-mail communications to be sent to selected members of the previous communication (e.g., exclusively to those who have not responded, exclusively to those that have responded, etc.). This is particularly useful when large groups of members are targets of the e-mail communication.

Advantageously, a self-modifying mail alias is provided. Based on responses detected by, for instance, the mail system, the original N members of the mail alias is reduced by N−1 for each respondent, in one example. Thus, a modified mail alias results having M members where M<N.

Although various embodiments are described above, these are only examples. For instance, many variations may be made to the communications environment described herein without departing from the spirit of the present invention. As an example, although three communications units are shown, many other communications units may be included in the communications environment. One or more aspects of the present invention are used to send e-mail communications to any number of e-mail responders. A communications unit may include one or more responders and/or senders. A communications unit can be a sender, a responder, or both. Further, the operating system may be other than the examples provided herein, and there are other examples of communications units. Many other variations are possible.

Moreover, although in the examples herein, the e-mail communication is sent via a mail alias and one or more other mail alias are created based on responses to the e-mail communication, in other embodiments, the e-mail is sent to a plurality of recipients absent use of a mail alias (e.g., by inputting the recipients in the TO section of the e-mail header). Additionally, even though in the examples herein the dynamically created mail aliases are modified versions of a mail alias sent to a larger population of members, in further examples, the dynamically created mail aliases are not modified versions of the sending mail alias. Yet further, although examples of mail aliases are provided herein, these are only examples. The names used in the examples and the contents of those examples are just provided for clarity purposes. A mail alias created herein may have any name and/or may include any designation of members, as desired. Further, in other embodiments, a mail alias may be dynamically created based on content of the replies. Many other variations are possible and are included within the scope of the claims appended herein.

In addition to the above, one or more steps in the logic flows can be deleted, performed in a different order, altered or added. As one example, to create one or more modified aliases, creation of an alias begins in response to receiving a reply to the e-mail and continues being revised, in response to replies, until the dynamically created e-mail is used to send an e-mail communication. In that scenario, the predetermined event is receipt of a reply. Many other variations are also possible.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail there, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of dynamically creating mail aliases usable in electronic communications in a communications environment, said method comprising:
   receiving a response to an electronic mail sent via a mail alias to a plurality of recipients, said receiving comprising receiving one or more responses from one or more recipients of the plurality of recipients, the mail alias being different than respective electronic mail addresses of the plurality of recipients;
   determining, in response to the receiving, that one electronic mail with one message is to be sent to one group of one or more members meeting a first criterion and another electronic mail with another message is to be sent to another group of one or more members meeting a second criterion different than the first criterion, wherein the first criterion comprises non-responding to the electronic email sent via the mail alias to the plurality of recipients, and wherein the second criterion comprises responding to the electronic email sent via the mail alias to the plurality of recipients;
   subsequently, upon a predefined occurrence, automatically creating, by a communications unit of the communications environment, one or more additional mail aliases, in response and with reference to receiving of the one or more responses, the one or more additional mail aliases being distinct from the mail alias, wherein the automatically creating comprises automatically generating for each additional mail alias of the one or more additional mail aliases a new name for the additional mail alias and automatically associating an electronic mail address of each member of a group of members to the automatically generated new name of the additional mail alias to enable the group of members to be specified via the additional mail alias, the additional mail alias being distinct from the respective electronic mail addresses of the group of members, and wherein the additional mail alias is subsequently selected and inserted into a TO section of the electronic, mail header of a subsequent electronic mail to be sent to the group of members via an electronic mail program and wherein the group of members is selected, at least in part, responsive to the receiving of the one or more responses from the one or more recipients; and
   wherein the automatically creating further comprises creating a mail alias for the one group, wherein the mail alias for the one group includes an electronic mail address for each member of the one or more members meeting the first criterion, and wherein the automatically creating further creates a mail alias for the another group that includes an electronic mail address for each member of the one or more members meeting the second criterion, wherein the automatically creating further includes adding an electronic mail address for a responder to the mail alias for the another group, in response to the responder responding.

2. The method of claim 1, wherein the creating the mail alias for the one group comprises automatically creating a mail alias of non-responders that includes the one or more recipients of the plurality of recipients that have not responded to the electronic mail and excludes the one or more recipients of the plurality of recipients that have responded to the electronic mail.

3. The method of claim 1, wherein the creating the mail alias for the another group comprises automatically creating a mail alias of responders that includes the one or more recipients of the plurality of recipients that have responded to the electronic mail and excludes the one or more recipients of the plurality of recipients that have not responded to the electronic mail.

4. The method of claim 1, wherein the automatically creating further comprises creating the one or more mail aliases without user intervention based on the one or more responses.

5. The method of claim 1, wherein the automatically creating is performed in response to receiving the one or more responses and in response to the predefined occurrence of a predetermined event.

6. The method of claim 5, wherein the predetermined event comprises one of expiration of a predetermined amount of time and receipt of a selected number of replies.

7. The method of claim 1, wherein the automatically creating further comprises:
   determining whether a mail alias of non-responders is to be created;
   creating a mail alias of non-responders, in response to the determining indicating the mail alias of non-responders is to be created, said mail alias of non-responders comprising the one or more recipients of the plurality of recipients that have not responded to the electronic mail and excluding the one or more recipients of the plurality of recipients that have responded to the electronic mail;
   determining whether a mail alias of responders is to be created; and
   creating the mail alias of responders, in response to the determining indicating the mail alias of responders is to be created, said mail alias of responders comprising the one or more recipients of the plurality of recipients that have responded to the electronic mail and excluding the one or more recipients of the plurality of recipients that have not responded to the electronic mail.

8. The method of claim 1, wherein the plurality of recipients are identified in a mail alias, and wherein at least one mail alias of the one or more mail aliases automatically created comprises a modified version of the mail alias.

9. The method of claim 1, further comprising:
   creating the electronic mail to be sent to the plurality of recipients, said creating including an indication that one or more mail aliases are allowed to be automatically created; and
   sending the electronic mail to the plurality of recipients.

10. A method of dynamically creating mail aliases usable in electronic communications in a communications environment, said method comprising:
    creating an electronic mail to be sent to a plurality of recipients via a mail alias, the mail alias being different than respective electronic mail addresses of the plurality of recipients, and said creating including an indication that one or more additional mail aliases are allowed to be automatically created;
    sending the electronic mail to the plurality of recipients via the mail alias;
    receiving one or more replies to the electronic mail from one or more recipients of the plurality of recipients;
    determining, in response to the receiving, that one electronic mail with one message is to be sent to one group of one or more members meeting a first criterion and another electronic mail with another message is to be sent to another group of one or more members meeting a second criterion different than the first criterion, wherein the first criterion comprises non-responding to the electronic email sent via the mail alias to the plurality of recipients, and wherein the second criterion comprises responding to the electronic email sent via the mail alias to the plurality of recipients;
    determining whether a predetermined event has occurred;
    upon occurrence of the predetermined event, automatically creating, by a communications unit of the communications environment, an additional mail alias of non-responders in response to the occurrence of the predetermined event, said additional mail alias of non-responders being distinct from the mail alias and including recipients of the plurality of recipients that have not responded to the electronic mail and excluding recipients of the plurality of recipients that have responded to the electronic mail, wherein the automatically creating the additional mail alias of non-responders comprises automatically generating a new name for the additional mail alias of non-responders and automatically associating an electronic mail address of each non-responder to the electronic mail to the automatically generated new name of the additional mail alias of non-responders to enable the non-responders to be specified via the additional mail alias of non-responders, the additional mail alias of non-responders being distinct from the respective electronic mail addresses of the non-responders;
    upon occurrence of the predetermined event, automatically creating, by the communications unit of the communications environment, an additional mail alias of responders, in response to the occurrence of the predetermined event, said additional mail alias of responders being distinct from the mail alias and including the recipients of the plurality of recipients that have responded over time to the electronic mail and excluding recipients of the plurality of recipients that have not responded to the electronic mail, wherein the automatically creating the additional mail alias of responders comprises automatically generating a new name for the additional mail alias and automatically associating an electronic mail address of each responder to the electronic mail to the automatically generated new name of the additional mail alias of responders to enable the responders to be specified via the additional mail alias of responders, the additional mail alias of responders being distinct from the respective electronic mail addresses of the responders, and wherein the automatically creating further includes adding an electronic address for at least one responder to the additional mail alias of responders, in response to the responder responding; and
    selecting at least one of the additional mail alias of non-responders or the additional mail alias of responders to send an electronic mail to members of the at least one of the additional mail alias of non-responders or the additional mail alias of responders, wherein the selecting includes providing the selected additional mail alias in a TO header of the electronic mail to be sent to members of the at least one of the additional mail alias of non-responders or the additional mail alias of responders.

11. A computer system for dynamically creating mail aliases usable in electronic communications, said computer system comprising:
    a memory; and
    a processor, in communications with the memory, wherein the computer system is configured to perform a method, the method comprising:
        receiving a response to an electronic mail sent via a mail alias to a plurality of recipients, the receiving comprising receiving one or more responses from one or more recipients of the plurality of recipients, the mail alias being different than respective electronic mail addresses of the plurality of recipients;

determining, in response to the receiving, that one electronic mail with one message is to be sent to one group of one or more members meeting a first criterion and another electronic mail with another message is to be sent to another group of one or more members meeting a second criterion different than the first criterion, wherein the first criterion comprises non-responding to the electronic email sent via the mail alias to the plurality of recipients, and wherein the second criterion comprises responding to the electronic email sent via the mail alias to the plurality of recipients;

subsequently, upon a predefined occurrence, automatically creating one or more additional mail aliases, in response and with reference to receiving of the one or more responses, the one or more additional mail aliases being distinct from the mail alias, wherein the automatically creating comprises automatically generating for each additional mail alias of the one or more additional mail aliases a new name for the additional mail alias and automatically associating an electronic mail address of each member of a group of members to the automatically generated new name of the additional mail alias to enable the group of members to be specified via the additional mail alias, the additional mail alias being distinct from the respective electronic mail addresses of the group of members, and wherein the additional mail alias is subsequently selected and inserted into a TO section of the electronic mail header of a subsequent electronic mail to be sent to the group of members via an electronic mail program, and wherein the group of members is selected, at least in part, responsive to the receiving of the one or more responses from the one or more recipients; and wherein the automatically creating further comprises creating a mail alias for the one group, wherein the mail alias for the one group includes an electronic mail address for each member of the one or more members meeting the first criterion, and wherein the automatically creating further creates mail alias for the another group that includes an electronic mail address for each member of the one or more members meeting the second criterion, wherein the automatically creating further includes adding an electronic mail address for a responder to the mail alias for the another group, in response to the responder responding.

12. The computer system of claim 11, wherein the creating the mail alias for the one group comprises automatically creating a mail alias of non-responders that includes the one or more recipients of the plurality of recipients that have not responded to the electronic mail and excludes the one or more recipients of the plurality of recipients that have responded to the electronic mail.

13. The system of claim 11, wherein the creating the mail alias for the another group comprises automatically creating a mail alias of responders that includes the one or more recipients of the plurality of recipients that have responded to the electronic mail and excludes the one or more recipients of the plurality of recipients that have not responded to the electronic mail.

14. A computer program product for dynamically creating mail aliases usable in electronic communications, the computer program product comprising:

a non-transitory storage medium readable by a processor and storing instructions for execution by the processor to perform a method comprising:

receiving a response to an electronic mail sent via a mail alias to a plurality of recipients, said receiving comprising receiving one or more responses from one or more recipients of the plurality of recipients, the mail alias being different than respective electronic mail addresses of the plurality of recipients;

determining, in response to the receiving, that one electronic mail with one message is to be sent to one group of one or more members meeting a first criterion and another electronic mail with another message is to be sent to another group of one or more members meeting a second criterion different than the first criterion, wherein the first criterion comprises non-responding to the electronic email sent via the mail alias to the plurality of recipients, and wherein the second criterion comprises responding to the electronic email sent via the mail alias to the plurality of recipients;

subsequently, upon a predefined occurrence, automatically creating one or more additional mail aliases, in response and with reference to receiving of the one or more responses, the one or more additional mail aliases being distinct from the mail alias, wherein the automatically creating comprises automatically generating for each additional mail alias of the one or more additional mail aliases a new name for the additional mail alias and automatically associating an electronic mail address of each member of a group of members to the automatically generated new name of the additional mail alias to enable the group of members to be specified via the additional mail alias, the additional mail alias being distinct from the respective electronic mail addresses of the group of members, and wherein the additional mail alias is subsequently selected and inserted into a TO section of the electronic mail header of a subsequent electronic mail to be sent to the group of members via an electronic mail program and wherein the group of members is selected, at least in part, responsive to the receiving of the one or more responses from the one or more recipients; and wherein the automatically creating further comprises creating a mail alias for the one group, wherein the mail alias for the one group includes an electronic mail address for each member of the one or more members meeting the first criterion, and wherein the automatically creating further creates a mail alias for the another group that includes an electronic mail address for each member of the one or more members meeting the second criterion, wherein the automatically creating further includes adding an electronic mail address for a responder to the mail alias for the another group, in response to the responder responding.

15. The computer program product of claim 14, wherein the creating the mail alias for the one group comprises automatically creating a mail alias of non-responders that includes the one or more recipients of the plurality of recipients that have not responded to the electronic mail and excludes the one or more recipients of the plurality of recipients that have responded to the electronic mail.

16. The computer program product of claim 14, wherein the creating the mail alias for the another group comprises automatically creating a mail alias of responders that includes the one or more recipients of the plurality of recipients that have responded to the electronic mail and excludes the one or more recipients of the plurality of recipients that have not responded to the electronic mail.

17. The computer program product of claim 14, wherein the automatically creating is performed in response to receiving the one or more responses and in response to the predefined occurrence of a predetermined event.

18. The computer program product of claim 14, wherein the method further comprises:

creating the electronic mail to be sent to the plurality of recipients, said creating including an indication that one or more mail aliases are allowed to be automatically created; and sending the electronic mail to the plurality of recipients.

* * * * *